April 28, 1970     V. H. LARSON     3,508,496
TRANSPORTATION SYSTEM
Filed Feb. 6, 1967     9 Sheets-Sheet 1
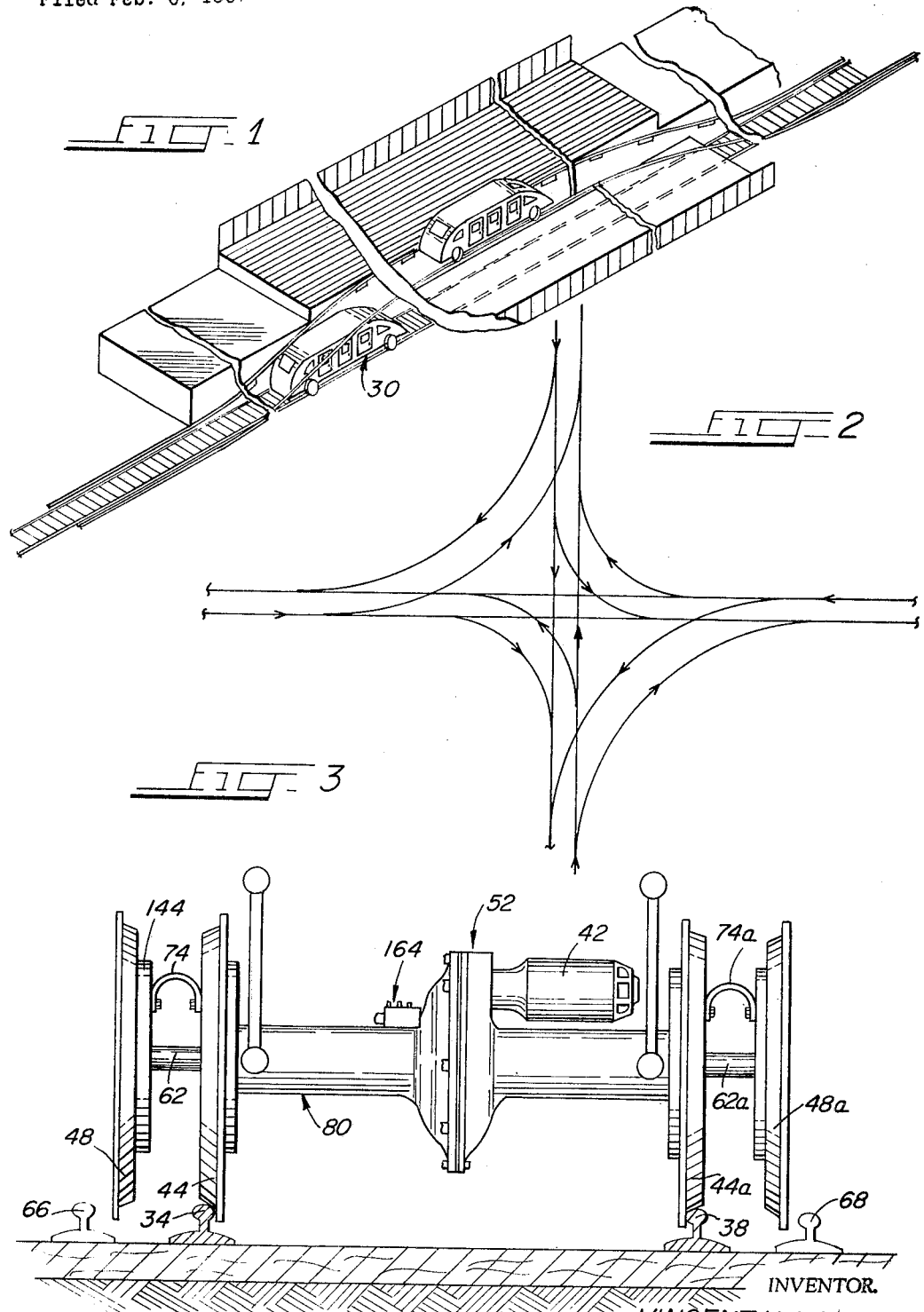
INVENTOR.
VINCENT H. LARSON
BY
Kegan, Kegan & Berkman
ATTYS

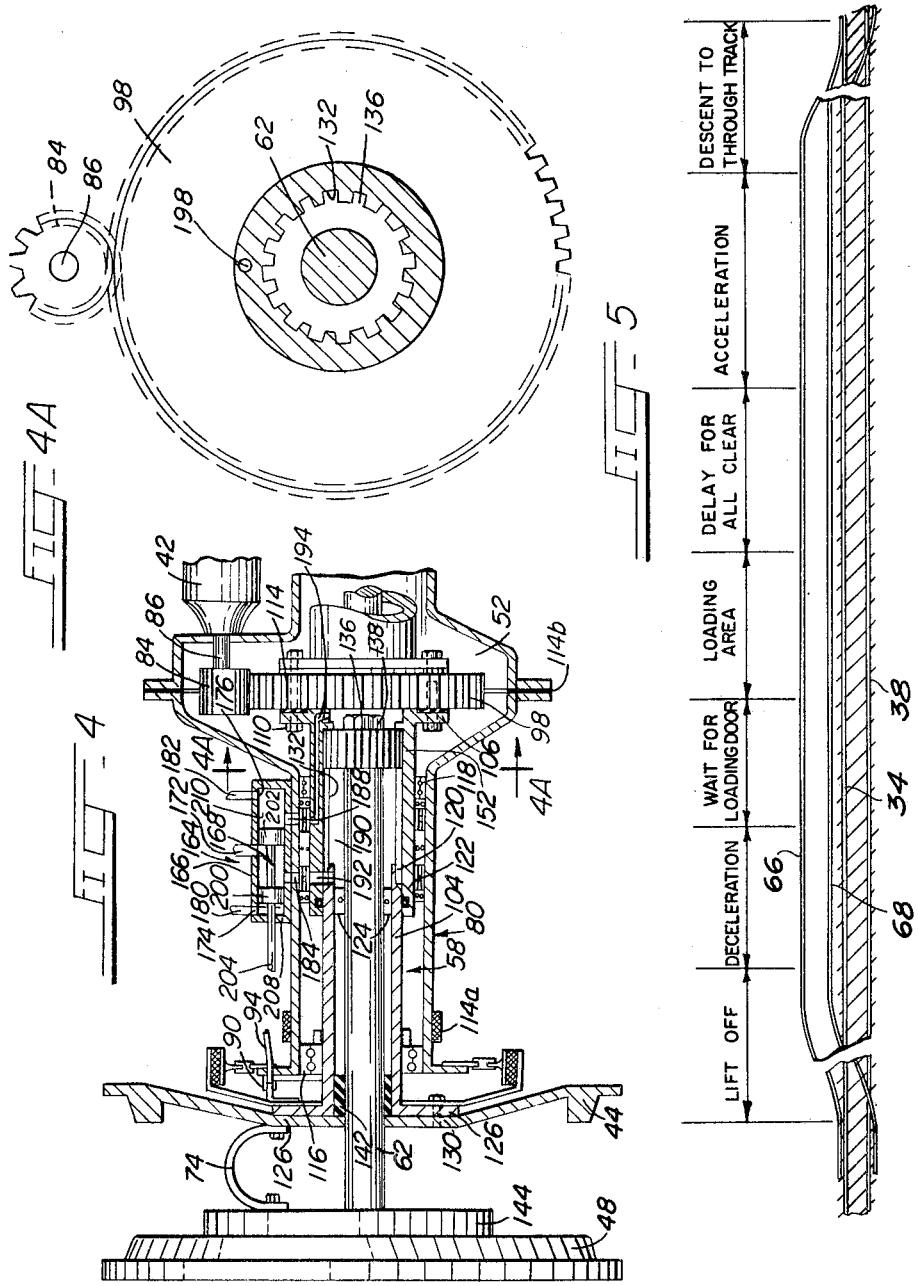

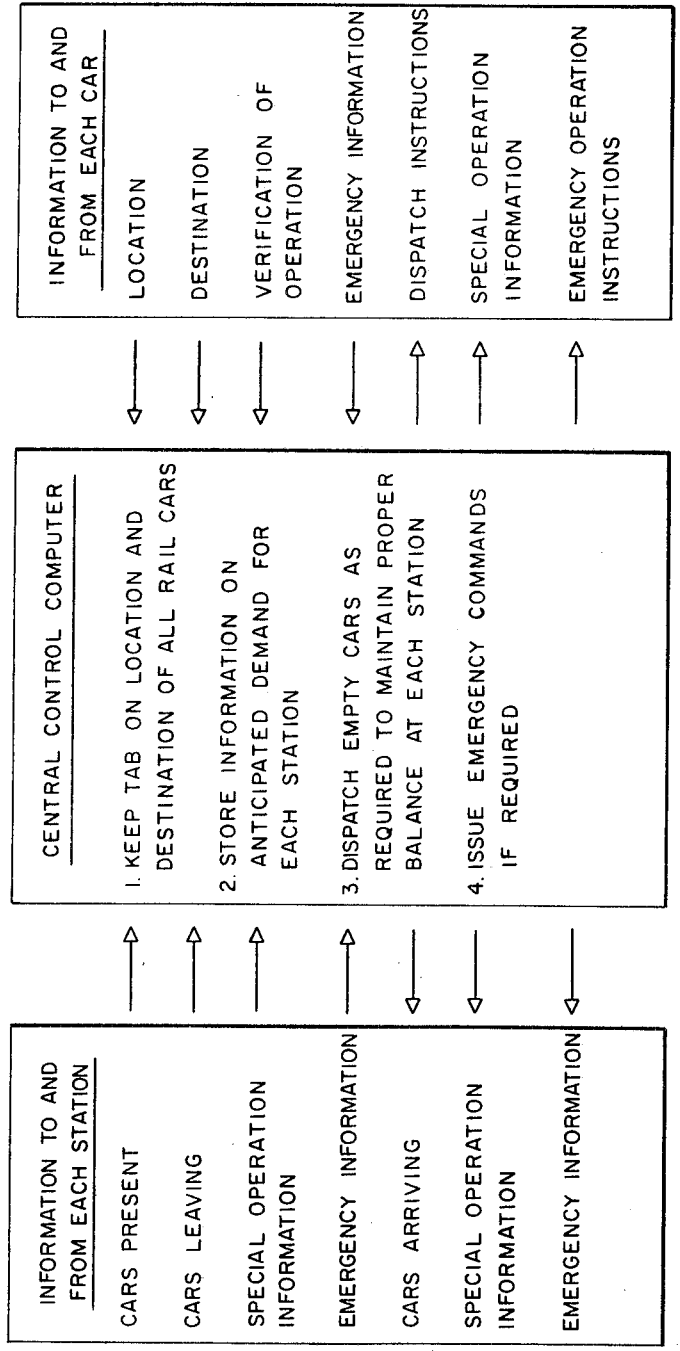

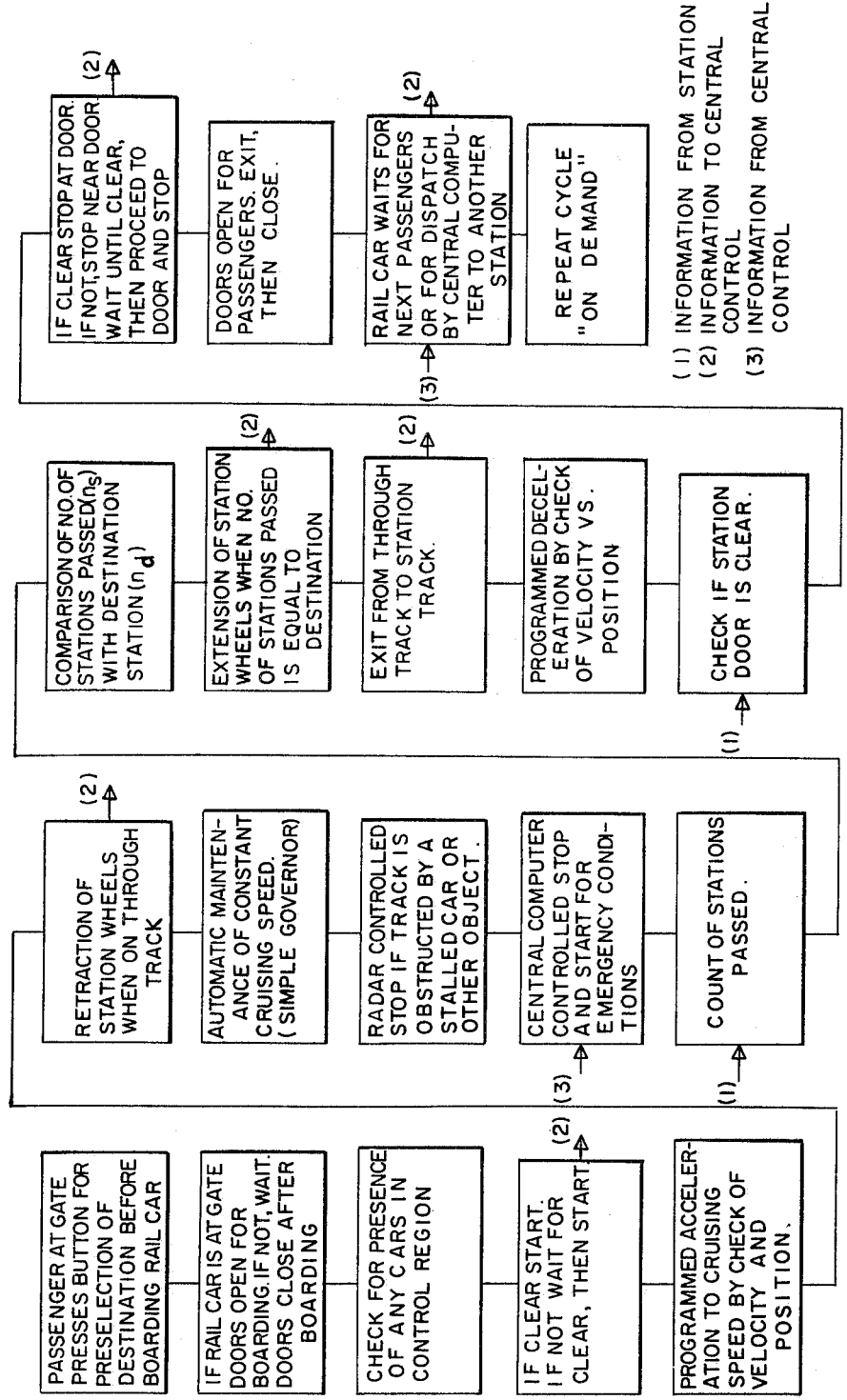

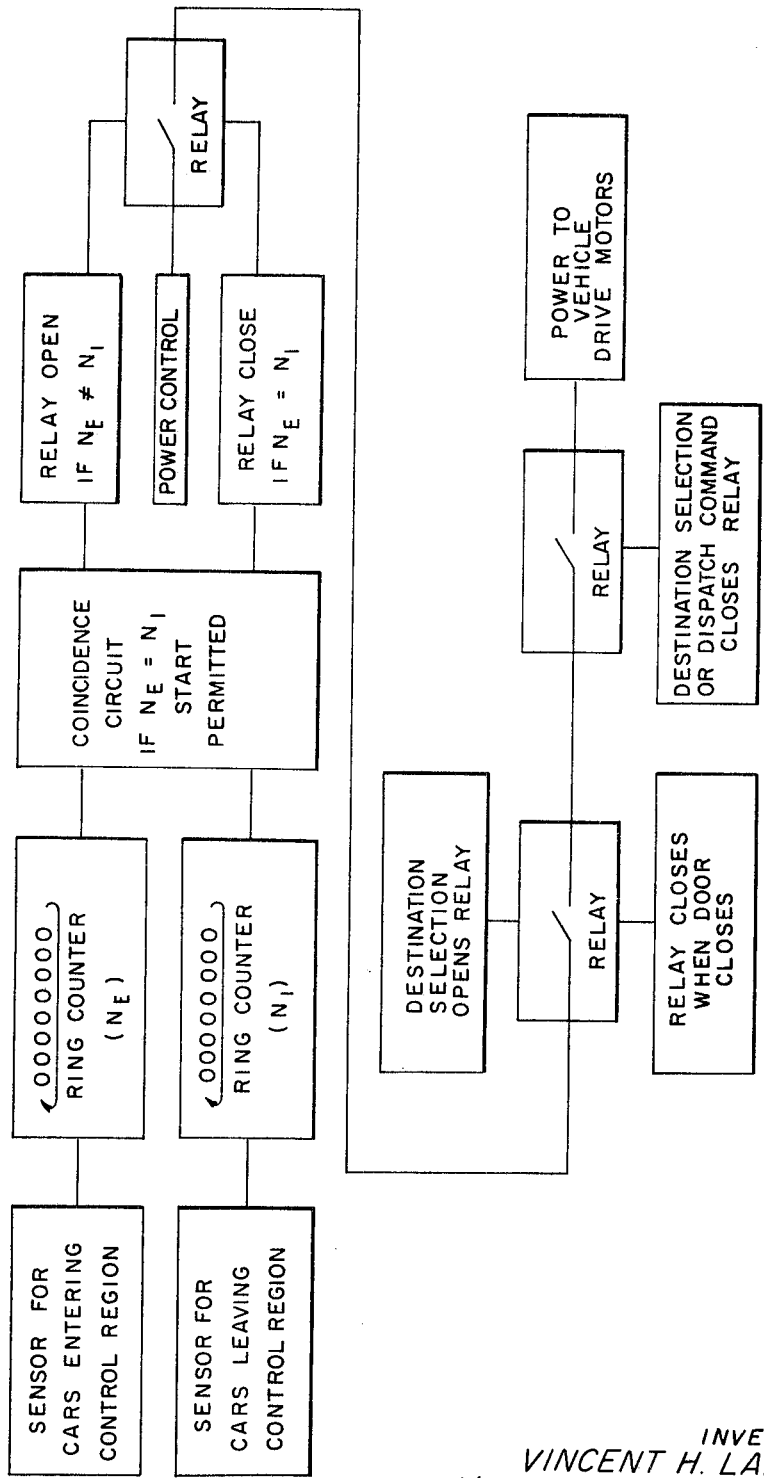

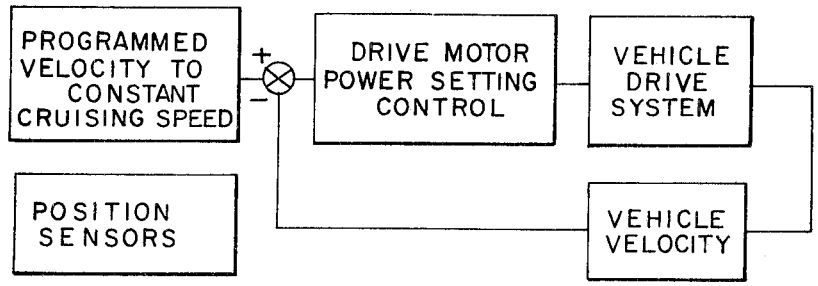
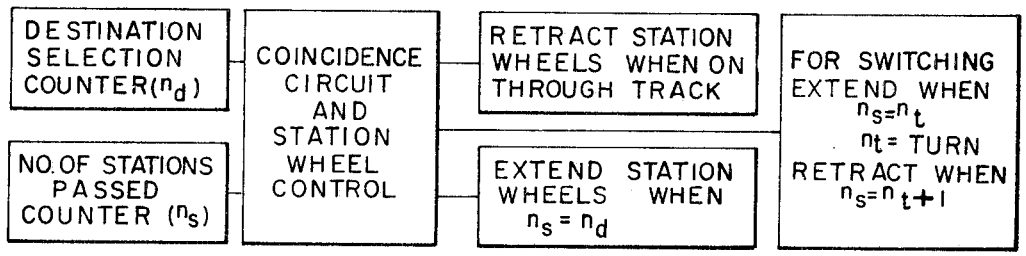
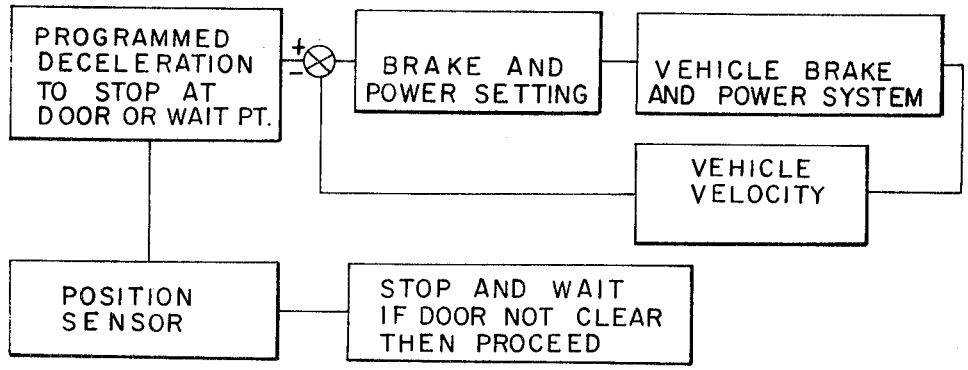
INVENTOR.
VINCENT H. LARSON

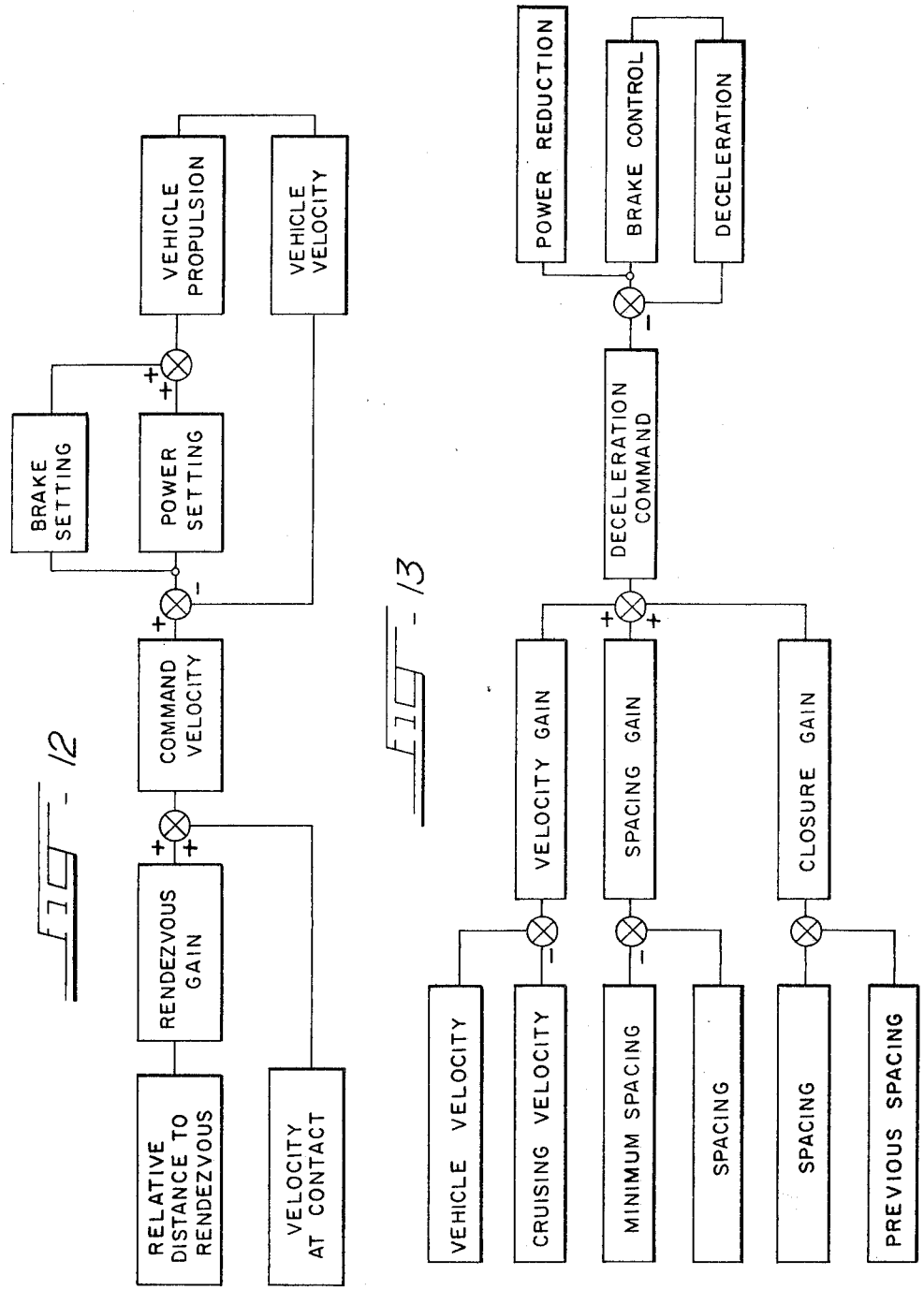

April 28, 1970  V. H. LARSON  3,508,496
TRANSPORTATION SYSTEM
Filed Feb. 6, 1967  9 Sheets-Sheet 8

FIG. 14

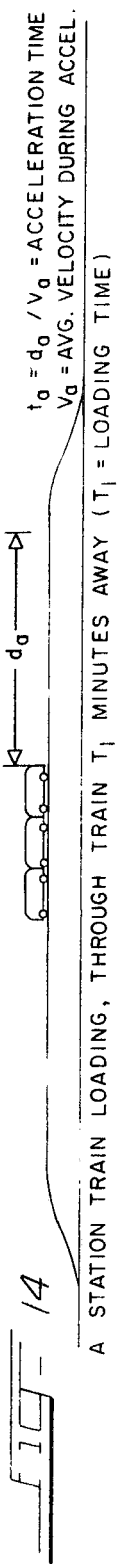

A. STATION TRAIN LOADING, THROUGH TRAIN $T_l$ MINUTES AWAY ($T_l$ = LOADING TIME)

$t_a = d_a / V_a$ = ACCELERATION TIME
$V_a$ = AVG. VELOCITY DURING ACCEL.

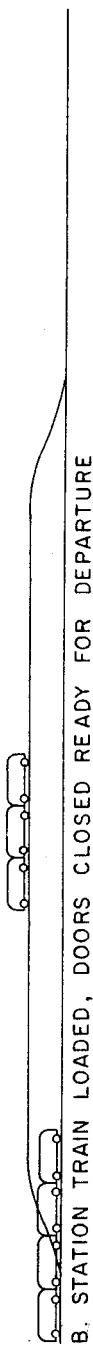

B. STATION TRAIN LOADED, DOORS CLOSED READY FOR DEPARTURE

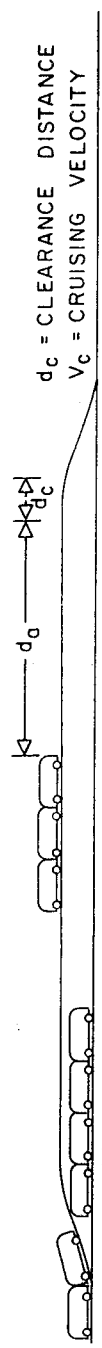

$d_c$ = CLEARANCE DISTANCE
$V_c$ = CRUISING VELOCITY

C. STATION TRAIN STARTS, CARS FOR THIS SECTION LIFTED OFF FROM THROUGH TRAIN

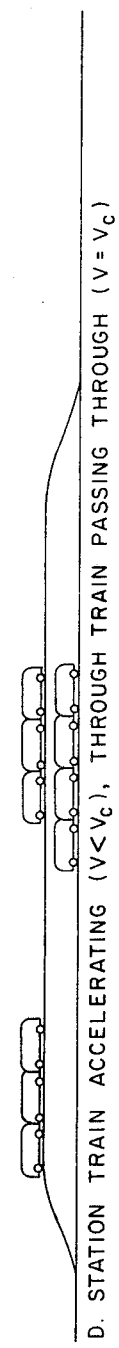

D. STATION TRAIN ACCELERATING ($V < V_c$), THROUGH TRAIN PASSING THROUGH ($V = V_c$)

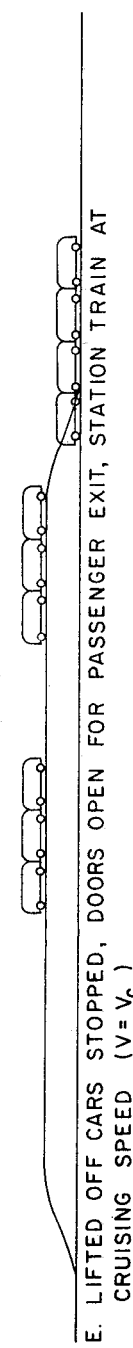

E. LIFTED OFF CARS STOPPED, DOORS OPEN FOR PASSENGER EXIT, STATION TRAIN AT CRUISING SPEED ($V = V_c$)

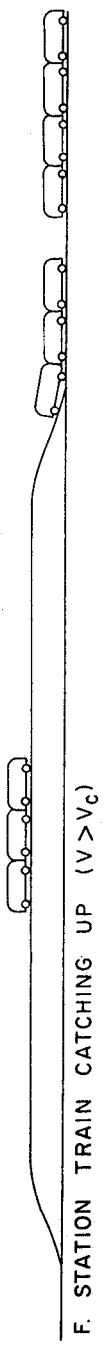

F. STATION TRAIN CATCHING UP ($V > V_c$)

G. TRACK RENDEZVOUS, TRAINS CONNECTED, DOORS BETWEEN CARS OPEN FOR PASSENGER ADJUSTMENT, i.e., MOVEMENT AFT FOR EXIT AT NEXT STATION OR FORWARD FOR THROUGH TRIP

INVENTOR
VINCENT H. LARSON

BY Kegan, Kegan & Berkman
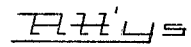

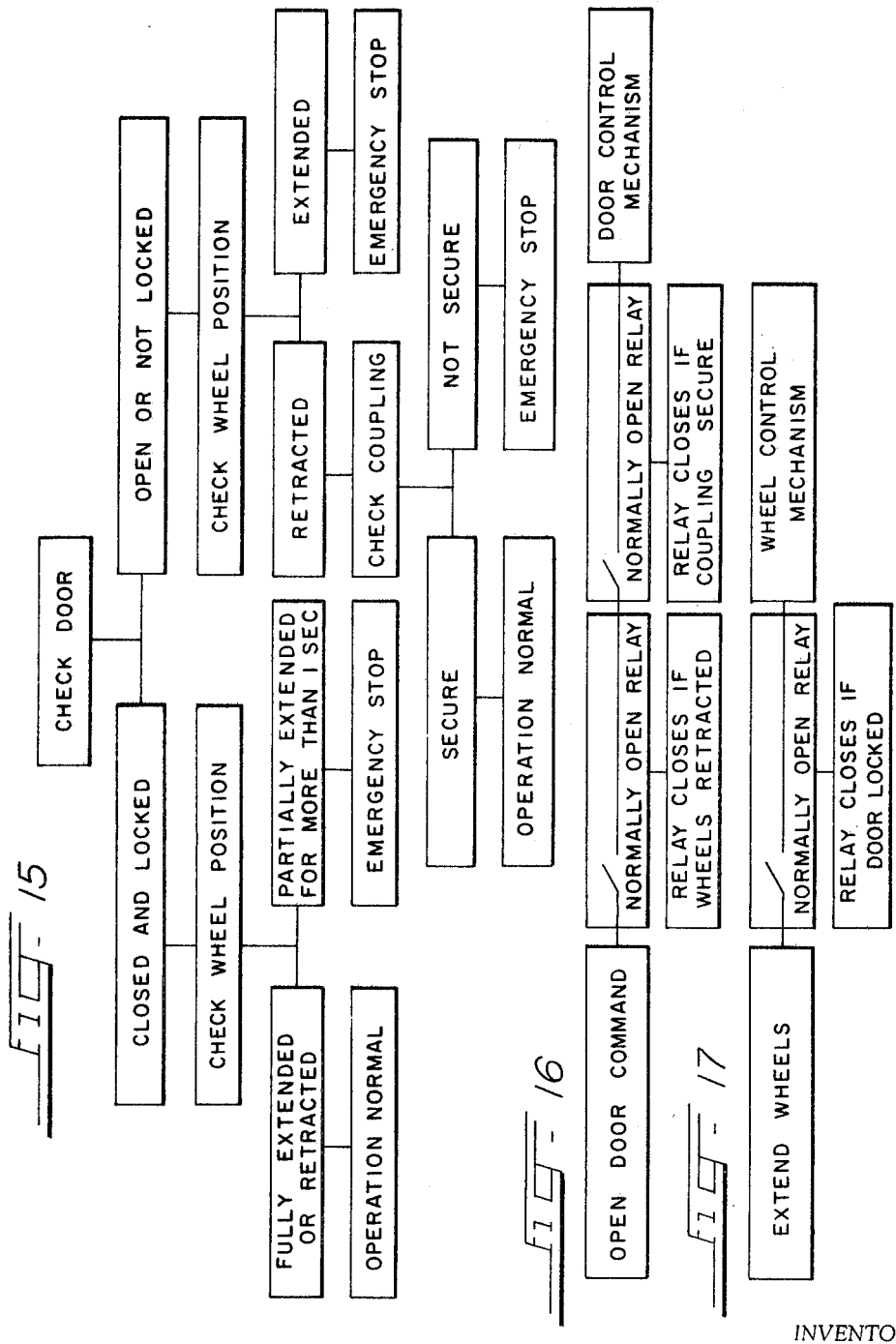

United States Patent Office 3,508,496
Patented Apr. 28, 1970

3,508,496
TRANSPORTATION SYSTEM
Vincent H. Larson, Evanston, Ill., assignor to Northwestern University, Evanston, Ill., a corporation of Illinois
Filed Feb. 6, 1967, Ser. No. 614,214
Int. Cl. E01b 25/06
U.S. Cl. 104—130                    9 Claims

ABSTRACT OF THE DISCLOSURE

A transportation system including wheeled vehicles traveling at constant and uniform speed on fixed rails or tracks extending along predetermined routes, the system being further characterized in that switching of vehicles to and from station tracks and to and from track sections leading to cross-route tracks is effected through utilization of a "lift-off" principle whereby the moving vehicles are physically transferred between the route tracks at a first level and other tracks at a second level by means of a set of vehicle-carried wheels extensible laterally with respect to a route track set of vehicle wheels. In another embodiment of the invention vehicle transfer is effected by lowering a second set of wheels to engage a second set of tracks, thereby lifting the vehicle from the first set of tracks.

---

This invention relates to transportation systems. More particularly, the invention is directed to an automatic transportation system in which vehicles move along predetermined routes at substantially uniform and constant speeds between stations spaced along the routes. An important feature of the invention is a concept which may be described as a "lift-off" switching principle.

It is the aim of the present invention to provide a simple, high-speed, automatically controlled transportation system suitable not only for metropolitan rapid transit but also for train-type transportation for relatively long distances. It is an important feature of the invention that the system provides safe transportation between stations along defined routes in the minimum time consistent with maximum operating speeds of the vehicles used. Saving in time is realized through the use of a novel vehicle and vehicle-support system which permits constant-speed travel between stations, with exit to and entrance from any station along the route, these exits and entrances being achieved without altering the vehicle support configuration, that is, without track switching. From the boarding station, after initial acceleration to the desired cruising speed, each vehicle travels at a constant speed until decelerating to stop at the trip destination.

The "lift-off" switching principle of the invention, which makes possible non-stop constant speed operation between stations, even though the origin and destination are (from a system viewpoint) random stations, utilizes a fixed non-switchable vehicle support means. In a preferred embodiment of the invention the vehicle support means comprises a double track system which includes a pair of continuous through tracks or cruising tracks and a pair of wider gauge tracks or station tracks, at least a portion of the latter straddling the cruising tracks. For cooperation with the two sets of tracks, the vehicles or rail cars of the transportation system are provided with dual support means or support engagement means which, in a preferred embodiment of the invention includes a first set of laterally spaced fixed "cruising" supports, the lateral spacing or tread corresponding to the spacing or gauge of the through tracks. In addition, the vehicles are provided with a second support means which comprise a set of variable or laterally positionable tread supports. In an outermost or laterally extended position, the spacing of the variable tread support coincides with the spacing of the station track gauge while in an inwardly disposed or retracted position, the over-all width of the variable tread supports (and of the vehicle itself) is less than the clearance spacing between the station tracks. In operation, when the variable tread or "station" supports are retracted, the vehicle rides on the through tracks. When the opposed station supports are extended laterally, the cooperating "station" track configuration is such that when the vehicle approaches a station, the vehicle-carried station supports engage the station track and lift the vehicle from the through track. The levels of the through track and the station track gradually diverge vertically so that a vehicle supported by the station track is lifted, the extent of lift being such as to permit a vehicle supported on the through tracks to pass below the vehicle carried by the station tracks.

As applied in the practice of the present invention, the lift-off switching concept involves a transference of the switching function from the track to the vehicle itself. This achievement is a very important feature of the invention and obviates any need for track switching, the track being at all times in a fixed configuration and yet always ready for entrance of vehicles, exit of vehicles, as well as through traffic. The lift-off switching technique of the invention also makes it possible for the vehicles to travel at constant velocity between stations. In turn, the constant velocity or uniform speed of travel makes it possible to space vehicles closely without danger of collision.

It is another important feature of the invention that the closely spaced vehicles moving at constant velocity may take different routes, including branch or cross routes if such routes are provided by the particular system involved.

It is still another important feature of the invention that not only are individual vehicles "lifted off," but in systems in which a "train" of vehicles is travelling along a route, a portion of the train may be "lifted off." Such a novel procedure is possible because in the present invention the switching functions performed by the vehicle itself alter that vehicle's course, effecting lift-off at the selected station or at a branch track. At the same time, the switching function does not affect the track or any other vehicle operating on the track.

Since the lateral extension of the station wheels (the vehicle switching function) can be performed immediately upon passing the last station or branch track preceding the desired lift-off point, there is ample time for effecting the extension and for actuating any required fail-safe check system.

Another important feature of the invention is that the basic concept is applicable for not only rapid transit operations in a metropolitan area but also for intercity transportation systems. Two variations of the basic concept, but both utilizing the lift-off principle, will be considered in detail below with respect to an individual vehicle system and a multi-vehicle train-type system. For the purpose of illustrative disclosure, and not by way of limitation, the design features and operational characteristics of the individual vehicle type of system will be considered in the context of a rapid transit system, and in the second illustrative example of the invention, a multi-vehicle train system employing the same basic principles but utilizing somewhat different systems operational concepts will be considered in the context of an intercity transportation system. The alternative application of individual vehicle systems to intercity transportation or of train systems to rapid transit uses will be obvious.

In the following detailed descriptions and in the accompanying illustrative drawings, the vehicle-carried support means will be described and illustrated as flanged wheels operating on conventional rails. It is to be expressly understood, however, that the present invention is in no sense limited to such conventional wheel-type support means. Rather, the principles here enunciated are recognized and contemplated as being directly applicable to non-conventional wheels, for example, pneumatic or other types of cushioned wheels, wheels with suitable provision for side guidance, for example, horizontal guide wheels which would provide lateral stability by following the inside of a suitable rail or track. It is also within the inventive concept to use other types of sliding or airbearing supports. For example, the present invention might be practiced using cooled rails with an ice or frost bearing surface, and "sled runners" on the vehicle. It will be recognized that in such cases suitable propulsion and braking means would be necessary. Linear electric motors and jet or propellor drives would be possibilities. An essential element of any system embodying the inventive concepts of the present invention is the lift-off principle. In one embodiment of the invention the outer vehicle support means is of a variable tread permitting extension for engagement of station track and consequent lift-off, and retraction to a stand-by position in which the over-all width permits passage of a vehicle on a through track between and unaffected by the station track. In another embodiment of the invention the vehicle carries two sets of vehicle support means arranged in tandem, members of one set being carried laterally outwardly of members of the other set and being lowerable to engage a pair of station tracks straddling a pair of through tracks, the station and the through tracks being at substantially the same level, whereby the lowered set of vehicle support means transfers the vehicle to the station track for movement therealong.

The present invention is described below with specific reference and application to a constant speed rapid transit system for non-stop, local, and express service. It is an important feature of the invention that it provides for a simple, high-speed, automatically controlled transportation system ensuring safe transportation with minimum waiting times. This saving in waiting times is achieved through an arrangement which requires only a short initial wait for accommodations, a minimum number of stops, and a very short vehicle change time of transfer is required. In accordance with the practice of the invention, each of these ends is achieved in an optimal manner through the use of relatively small cars operating at constant or uniform cruising speed in a non-stop mode between the point of passenger entrance and exit, either at a transfer point or at an ultimate destination. The system of the invention contemplates passenger loading and unloading stations which are spaced at reasonable intervals along the route so that the system provides efficient local transportation but at express speeds.

It is also an important feature of the invention that, for each passenger, operation is essentially non-stop, thus providing through express transportation to and from all stations. In each case, the destination of the non-stop run is preselected (at the time of boarding) and this selection may be for any station between the boarding station and the end of the line. From start to stop the operation of the rail car is entirely automatic, without an operator, somewhat similar to a non-stop ride on an elevator, but at high-speed, in upholstered chair comfort.

The elimination of waiting time for departure from a station to a given destination is achieved through the use of relatively small (number of passengers) rail cars, each car conveniently accommodating up to about nine passengers and actual capacity being dependent upon a detailed analysis of the anticipated passenger traffic. During rush hours when a sufficient number of passengers would arrive "at one time" for a single destination, the rail car would be filled. At other times the rail car would leave almost immediately after the passengers boarded even though only a single passenger were going to the particular destination. During heavy traffic periods the vehicles available would include reserve cars at each station and replacements arriving at short intervals. In general, a passenger would not board a rail car with another passenger unless he and the other passenger had both selected the same ultimate stop as a destination. In this way each passenger is assured a non-stop trip.

In a preferred embodiment of the present invention a rail or track type transit system has been selected because this type of system is particularly suited for non-stop type of operation. Another important factor is that vehicles with the single degree of freedom characteristic of operation on a track tend to be inherently safer than other types of vehicles and also impose less stringent requirement on the automatic control system.

The novel features which characterize this invention are set forth with particularity in the appended claims. The invention itself, however, both as to its organization and operation, as well as additional objects, advantages, and features thereof, will best be understood from the following description considered in conjunction with the accompanying drawings, in which:

FIGURE 1 is a perspective view of components of the transportation system of the invention showing rail cars, cruising tracks, a station stop, and station tracks, the latter including a lift-off section embodying the principles of the invention;

FIGURE 2 shows a preferred track cross over and interchange arrangement, each line representing a pair of rails;

FIGURE 3 is a front elevational view of a dual axle embodying the principles of the present invention and including dual sets of wheels;

FIGURE 4 is a fragmentary view partly in section and illustrating a preferred mechanism for controlling the extension and the retraction of the "station wheels" of the vehicles of the invention;

FIGURE 4A is an enlarged partial vertical cross-sectional view taken substantially on lines 4A—4A of FIGURE 4.

FIGURE 5 is a diagrammatic representation of a station track configuration, the station tracks being elevated above and supported outboard of the through tracks;

FIGURE 6 is a schematic diagram of the over-all control system functions indicating the major information requirements for these control system functions;

FIGURE 7 is a schematic diagram of the operational details of the rail car system of the invention, information transmitted to and received from other points in the system being indicated by numbers;

FIGURE 8 is a schematic diagram of the vehicle start control system illustrating the use of ring counters to store information for start control;

FIGURE 9 is a functional schematic diagram of acceleration and velocity control;

FIGURE 10 is a schematic diagram of the system for controlling extension and retraction of the station wheels of the vehicles;

FIGURE 11 is a schematic diagram of the deceleration and stop control for the vehicles of the transportation system;

FIGURE 12 is a schematic diagram of the track rendezvous control system of the invention;

FIGURE 13 is a schematic diagram of the emergency stopping and minimum spacing control system;

FIGURE 14 is a schematic diagram illustrating a sequence of typical events in a lift-off and rendezvous;

FIGURE 15 is a schematic diagram of the fail-safe check system of the invention in the train-type application; and FIGURES 16 and 17 are schematic diagrams of the vehicle door controls and the wheel extension interlocks for train-type operation.

Referring to the drawings which illustrate diagrammatically preferred embodiments of the invention, FIGURE 1 is a perspective illustration of component elements of the transportation system of the invention finding utility in the practice thereof. The rail car 30 shown is electrically powered, power being conveniently supplied through a power rail 34 and a ground rail 38 in a manner well-known in the art, and illustrated schematically in FIGURE 3. For example, power may be supplied to a drive assembly mounted on the rail car 30 and movable therewith. Other power means such as a third rail or internal combustion engines could be utilized. However, in the embodiment of the invention illustrated, the drive assembly of the motorized cars or carriages includes a synchronoous motor 42 which develops a uniform speed as set by the frequency of the driving voltage impressed upon the motor by power supplied through the conductor (rails) 34 and 38. Since all of the rail cars are driven from the same power source and have the same synchronous speed, all of the vehicles of the system moving between the various stations travel at a common and fixed uniform speed. Alternatively, other types of motors with suitable velocity control means may be used.

The car wheel 44 may be driven through a suitable gear train or gearing system 52 as shown in FIGURE 4. Each rail car 30 is provided with two complete sets of wheels, in a dual arrangement. A given dual set includes a pair of inner or cruising wheels 44 and 44a, these being laterally spaced in correspondence with the standard tread, and supporting the vehicle on standard rails during cruising operation (between stations) at a constant speed. A pair of station wheels or outer wheels 48 and 48a completes the dual set. The station wheels are shiftable laterally between an inward, stand-by position and an extended, functional position as explained more fully hereinbelow. In one embodiment of the invention, the station wheels 48 and 48a are preferably flanged at the outer edge portions to preclude inadvertent inward shifting or retraction.

While the (outer) station wheels may be mounted on axles distinct from the axle supporting the (inner) cruising wheels, in the particular example of the invention illustrated, the crusing wheels and the station wheels are coaxial. As seen most clearly in FIGURE 4, the assembly on which the cruising and station wheels are mounted comprises a composite axle which includes inner and outer coaxial and slidably disposed elements. That is, in a given assembly the cruising wheel 44 is mounted on a tubular axle 58 and the station wheel 48 is mounted on an inner axle member 62, the latter being coaxial with and telescopically supported within the tubular axle 58. Alternatively, the variable tread station wheels 48 and 48a may be mounted fore or aft of the cruising wheels using a separate axle or an independent suspension arrangement.

In accordance with the practice of the present invention, the station wheels 48 and 48a supported on corresponding telescoping axles 62 and 62a are displaceable laterally outwardly from a position adjacent corresponding cruising wheels 44 and 44a to an ultimate extended span or tread which corresponds to the lateral spacing of a second pair of tracks or rails 66 and 68 which are longitudinally aligned and comprise a pair of tracks mounted outboard of the standard or cruising tracks 34 and 38. For purposes of illustrative disclosure the present invention will be described with reference to an arrangement in which the outboard or the station tracks define an over-all width or tread approximately one and one-half feet greater than the tread of the cruising rail system. It will be evident that for this arrangement, and with the station wheels occupying a rest or standby position adjacent to but slightly outwardly of the cruising wheels, the station wheels each move approximately 6 inches outwardly to establish a span corresponding to that of their cooperating station rails. The actual extent of movement for any particular case will, of course, depend upon the particular car and track design adapted. Since the structural arrangement described requires only limited lateral movement of the station wheels during extension and retraction operations rapid positioning is possible.

In the example of the invention illustrated, the rail cars 30 are electrically powered through a cooperating wheel 44 and axle 58, the opposite wheel 44a and its corresponding axle being electrically isolated or insulated from the first wheel and axle so that electrical power may be supplied to the drive motor 42 through a conductor system comprising opposed rails, including the power rail 34 and the ground rail 38. As shown in FIGURE 4, flexible conductor means 74 interconnect the "power" wheel 44 with its corresponding station wheel 48 so that, through power supplied to both the cruising rail 34 and the outer or station rail 66, there will be no interruption in the energization of the rail car when the car is physically transferred from the cruising rails to the station rails.

Any preferred means including electrical, mechanical, hydraulic or pneumatic or any combination of these may be used to control the extension and retraction of the station wheels. For purposes of illustrative disclosure one such mechanism is illustrated in FIGURE 4, which shows, partly in vertical section, a unit wheel assembly including a frame or housing 80, the gear train 52 supported within the housing, the axle assembly extending coaxially within and supported in the housing, and means coupling the axle assembly to the gear train 52 for driving the car wheels 44 and 48. As seen in FIGURE 4, the gear train 52 includes a drive gear 84 powered by the drive motor 42 through a shaft 86. Electrical power supplied from the power rail 34 (or 66) to the power wheel 44 (or 48), and then by means of a suitable slip ring assembly 90 and cable means 94 is delivered to the motor 42. The circuit is completed through the opposite wheel 44a (or 48a) and its supporting ground rail 38 or 68, in a manner well-known to those skilled in the art. The drive gear 84 engages and energizes a cooperating driven gear 98 to which is fastened the axle assembly. In the particular example of the structure illustrated, the tubular axle 58 is fabricated of two separate structures 102 and 104, the axially inward element 102 being formed with an integral flange 106 extending generally transversely of the longitudinal axis of the axle assembly and fastened to the gear 98 by bolts 110 or any equivalent means. Insulation means 114, 114a and 114b isolate the axle assembly from the car frame and the axle mounting flange 106 from the gear train 52. A bearing and retainer assembly 116 and a second bearing 118 support the axle assembly within the housing 80, the two tubular axle elements 102 and 104 intercoupling at their ends through mating splines 120. Seals 122 and 124 are provided between adjacent contiguous surfaces. A flange 126 integrally formed with the axle element 104 at an end thereof opposed to the driven gear 98 is fastened to the hub portion of the inner or cruising wheel 44 by means of bolts 130 or any other suiable equivalent so that rotational movement imparted to the driven gear 98 is effective to drive the rail car wheel 44.

The tubular axle element 102 is internally splined at 132 and a mating spline pinion 136 securely fastened at 138 onto and keyed with the inner axle 62 meshes with the splines 132 of axle element 102. The internal axle 62 is supported adjacent its outer end to extend slidably through the center of the inner wheel 44, a suitable annular bushing or bearing 142 being provided. The outer wheel 48 is mounted on a flange 144 at the extreme end of the internal axle 62, in the usual manner.

Since the internal splining on the tubular axle 102 extends along substantially the full length of the axle 102, it will be apparent that the internal axle 62 is capable of axial movement laterally within the tubular axle 58, so that the station wheel 48 may be shifted from an inward or standby position, assumed during route travel between stations, to an outwardly extended position to engage and bear upon the lift-off station tracks or rails 66 and 68 at any selectable station or transfer point along the route.

The retraction and extension of the inner axle 62 and its associated station wheel 48 may be accomplished through any preferred mechanism including mechanical, electrical, or hydraulic, or a combination of these. In the example of the invention illustrated, a hydraulic system is employed. In this system the spline pinion 136 functions as a piston slidably disposed in a fluid-tight housing or cylinder whose principal wall 152 is the tubular axle 102. The generally planar face 156 of the driven gear 98 forms one end wall of the cylinder 102, the opposite end wall being an annular wall formed by the seal 124 disposed between the tubular axle element 104 and the sliding inner axle 62.

Pressurized hydraulic fluid for energizing the hydraulic system is supplied through a hydraulic valve 164 from a reservoir and pump (not shown). The reservoir is conventional and the hydraulic pump itself is constructed and operates in accordance with principles well-known in the art. Accordingly, no further description of these structures is necessary. In the preferred embodiment of the invention illustrated in FIGURE 4, the hydraulic valve 164 is a four-way valve defining a generally cylindrical wall or housing 166 having slidably disposed therewithin in fluid-sealing engagement with the inner surface of the cylindrical wall 166 an elongated double flanged spool 168. Fluid porting means comprising pressurized fluid supply port 172 and exhaust ports 174 and 176 communicate through conduits 180 and 182 with the hydraulic pump and the fluid reservoir, and porting means 184 and 188 connect the hydraulic valve 164 with the interior 190 of the cylinder 102 through openings 192 and 194 extending through the wall 152 of the tubular axle 102 at axially spaced positions along the length thereof. This hydraulic system constitutes the means by which the piston-like spline 136 is selectably shiftable either to extend or to retract the station wheel 48 mechanically fastened thereto. The arrangement described includes conventional fluid channels and conduits such as the channel 198 extending between and interconnecting the porting means 188 of the hydraulic valve 164 with the fluid inlet and exhaust port 194 communicating with the cavity 190 within the tubular axle 102.

The spool 168 is integrally formed with a pair of axially spaced radially extending walls 200 and 202 and an axially extending rod 204 which projects through an end wall 208 of the valve housing 166 whereby the fluid-flow-directing spool may be effectively positioned axially within the cylindrical cavity 210 of the hydraulic valve 164 to direct the flow of pressurized fluid, and required axial shifting of the station wheel assembly. In the position of the hydraulic valve 164 illustrated in FIGURE 4, the sliding spool 168 is shown displaced toward the left within the valve chamber 210. In this position the path of pressurized fluid entering through the conduit 172 and into the valve chamber 210 fluid supply port 178 through the wall port 184 and the wall port 192 of the tubular axle 102 and into the axle cavity 190 to urge the piston spline 136 axially to the right thereby to displace the station wheel 48 to its inward or standby position. Extension of the axle 62 and the station wheel 48 is effected by pulling the spool assembly 164 to the right. In the latter position the path of pressurized hydraulic fluid from the line 173 is through the exhaust port 188 and the channel 198 and finally through the wall opening 194 of the tubular axle 102 at a position to the right of the piston-like spline 136 (FIGURE 4). The pressurized fluid entering the cavity 190 of the tubular axle 102 at the right side of the spline 136 displaces the spline to the left causing the hydraulic fluid in the left hand portion of the chamber 190 to exhaust through the ports 192 and 184 to the hydraulic valve chamber 210 and finally from the hydraulic valve through the fluid return port 174. Positioning of the control spool 164 may be effected in any preferred manner, and in accordance with the practice of the present invention this shifting is carried out automatically as a function of preset station selection. The specific mechanism for effecting the extension and retraction of the station wheels is not critical in the present invention and any preferred technique may be utilized. One convenient method of providing a signal for valve control is a simple dual electronic ring counter arrangement and is described hereinbelow and illustrated schematically in the block diagram of FIGURE 10.

The station track configuration and its relation to the cruising track are illustrated schematically in FIGURE 5. Basically, the station track consists of a pair of parallel tracks mounted outboard of the standard or the cruising track and having a track width corresponding to the tread of the rail car station wheels in their extended position. The rail elements 66 and 68 of the station track, supported from the outside using any suitable means and without cross-ties in the ascent and the descent regions, include a section which provides a gradual rise or lift relative to the through tracks 34 and 38 to an upper level which constitutes the deceleration region for the rail car 30. The extent of lift-off is such that a decelerated rail car is supported above the cruising through track at a height sufficient to preclude any interference with other rail cars travelling on the through track to other stations. As indicated in FIGURE 5, the linear physical extent of the elevated or the station track is sufficient to provide, in addition to deceleration travel, waiting and loading areas, as well as any delay areas which may be required. In addition, at its far end, the station track includes an acceleration region along which the rail car is brought to cruising speed preparatory to reentry upon the through track. An adequate number of stations are provided so that the system provides effective local transit at economically feasible distance increments.

At route ends as well as at high travel density points along the routes, are special "turn-around" stations are tracks so that the required number of cars are maintained at these positions of the system. This arrangement accommodates heavy traffic without the necessity of the cars travelling the full route before return to a station where high departure rates are required.

The rail cars 30 are preferably low in contour, with passenger positions similar to those in automobile seating arrangements. The resulting low center of gravity eliminates or greatly reduces the rocking and pitching characteristic of most rail vehicles and makes feasible vehicle design with relatively soft springing. The constant speed at which the cars travel along the route permits a track layout (banking of curves, etc.) so that side load on rails and wheels is minimized. As a result, the rail cars provide a ride comparable to that achieved in a suspended mono-rail type of vehicle, including all of the advantages in such a support system. At the same time the system of the invention preserves the inherent simplicity and economy of construction associated with vehicles operating on two fixed tracks. It is contemplated that in preferred embodiment of the invention, the low profile of the rail cars would permit accommodation of both the through track and the upper station track in a conventional subway tube.

In operation, the station wheels 48 and 48a are extended as soon as the rail car 30 passes that station immediately preceding the station destination of the car. Thus, when the car arrives at the station tracks the station wheels are in a position to effect an exit from the cruising or the through track onto the station track. Deceleration of the rail car is controlled automatically and brings the car to a stop at a loading door, in a manner similar to the operation of an automatic elevator. Automatic controls also automatically accelerate the rail car prior to its return to the through track, whereupon the station wheels retract to a stand-by position. In the system of the transportation arrangement described above, a rail car does not decelerate until lifted by the station wheel assembly and track so as to clear the through track sufficiently to permit following cars to pass beneath. In this constant speed or uniform cruising speed operation, rail cars may safely follow each other very closely in high traffic density periods or locations, only simple control mechanisms being needed.

In a preferred form of the present invention, the rail car transit system is entirely automatic; no car operators are required. In effectuating automatic operation means are provided to control departure, automatic acceleration, speed, preselection of destination, automatic deceleration, stopping, as well as fail-safe and emergency controls to ensure passenger comfort and safety under all conditions.

In the illustrative example of the invention described, automatic control is provided through a central system control computer working in conjunction with individual vehicle control systems regulating specific factors of vehicle operation, and station control systems which monitor and regulate other aspects of the operation at each station. The over-all control system functions are indicated schematically by the block diagram of FIGURE 6 in which are listed the major information requirements for the control functions and including information from remote elements. Functions of a purely local nature are not indicated on this diagram (e.g. control of constant vehicle velocity, control of passenger movement, and fee payment at stations).

Operational details of the rail car system are illustrated schematically in the block diagram of FIGURE 7. Those aspects of the control which require information to or from other points in the system are indicated by numbers, and the major over-all system and vehicle control functions and sequential characteristics of the system are indicated by the various blocks.

An independent or random schedule of the type contemplated in the practice of the present invention permits vehicle departure on an on-demand basis. It is apparent that this particular mode of operation requires a checking mechanism to make certain that a given vehicle entering the through track will clear any other vehicles passing through. Since all vehicles on the through track travel at the same constant velocity $v_c$, if entering vehicles are always accelerated at the same rates, the time required for a given vehicle to reach the through track would be a known and constant value, for example, $t_a$. During the time $t_a$ all cars on the through track would travel a distance $v_c t_a$ and, accordingly, car starting would be permitted if a region of length $2d_c$ plus $1_v$ on the through track were clear (where $d_c$ is the minimum clearance distance required between cars on the through track and $1_c$ is the length of the entering vehicle). The midpoint of the control region would be a distance $v_c t_a$ upstream from the point at which a car leaving a station would enter the through track.

It is contemplated that the vehicle start control also requires means to determine whether or not any vehicle is in the control region and means to delay the departure of a rail car from a station if the control region is not clear. An example of a suitable control system of this type is illustrated in the block diagram of FIGURE 8. As shown, a pair of electronic (or mechanical) ring counters may be used to store information for the departure control. Photo-electric, magnetic, or other suitable types of sensors positioned at the entrance to the control region provide signals which advance the ring counter whenever a rail car enters the control region. Similarly, a sensor at the exit from the control region advances a second ring counter whenever a car leaves that region. With no vehicle in the control region, the two similar counters would be at the same initial position. Therefore, with a one-step advance for each entrance and exit for the respective counters, their state would be the same if and only if all vehicles entering the control regions had also left that region. Fail-safe means are provided so that extraneous signals are not received and acted upon by the counters. In the preferred form of the invention described, the counters would be cyclic, and to prevent ambiguity the counters would have a minimum counting capacity no less than the maximum number of cars which could be in the control region at a given time.

It is apparent that other means for checking for the presence of vehicles in the control region may be used. For example, there may be provided a series of sensors along the region spaced closely enough so that at least one would always having in "view" any vehicle present in the control region. The safe operation requirement would then be that all sensors give a "no vehicle present" report before departure is permitted. The no departure control may be obtained, for example, through relays, (one for each sensor) connected in series so that unless all relays were closed the vehicle could not start. In this particular form of control, the relays would be of the "normally closed" type, and a signal from a sensor would then open its associated relay.

Still another means of checking the control region is to use a beam, for example, an ultrasonic or radar beam, which is focused on a sensor after passing diagonally along the region. In this arrangement, the beam is interrupted if any vehicle is present in the control region, and thus no signal at the sensor effects a delay in car departure.

Acceleration control means are required to insure uniform acceleration times so that vehicles entering the through track arrive at the proper instant. A suitable typical control arrangement is illustrated functionally by the block diagram of FIGURE 9. This control arrangement utilizes a simple closed loop control or speed governor with the input or desired velocity fed in as a function of position. The control arrangement illustrated provides an implicit control of the acceleration time and, in practice, if a vehicle is at the entrance or at the exit of the control region, the entering vehicle would enter at such a point as to maintain minimum safe clearance distances between vehicles.

As indicated schematically in the block diagram of FIGURE 11, the automatic means for stopping the rail car are similar to the means for controlling the acceleration, the former having the added capability to sense whether the unloading position is clear so that, otherwise, the car will stop before reaching a second car in the loading area. With an understanding of the foregoing explanation of the over-all operation of the system, attention is now re-directed to FIGURE 5 in which the station area track has been divided into seven regions:

(1) A lift-off region or regions in which the station track rises gradually to lift a vehicle from the through track to a height sufficient to permit other vehicles to pass below. In the limited lift-off region the rail car travels at the constant cruising speed.

(2) A deceleration region comprising a length of track sufficient for a vehicle to slow to a stop from cruising speed.

(3) A delay region of a length sufficient for several cars, permitting hesitation of these cars at any time that a loading door is not available.

(4) A loading and unloading region of a length sufficient to accommodate one or more cars as required by the maximum passenger traffic at the particular station.

(5) A delay region in which a car proceeds and then accelerates or delays, if necessary, i.e. vehicles are present in the control region.

(6) An acceleration region in which the rail car accelerates to cruising speed, and, (7) A descent region to the through track.

In addition to the basic operational controls, each vehicle is equipped with adequate fail-safe and emergency-type controls including but not necessarily limited to the following:

(1) A radar or sonar type emergency stopping control which automatically slows or stops a vehicle at any time that vehicle approaches too close or is in danger of overtaking another vehicle too rapidly.

(2) An emergency control to permit stopping or other necessary action if commanded by central control.

(3) Check means to determine if station wheels are in proper position for exit or through travel with controlled corrective action or emergency stopping if required.

(4) Checking means to determine if exit at a given preselected station is permitted by traffic conditions and automatically active to effect exit at the nearest permissible station in the event of congestion or other problems.

(5) Other fail-safe and emergency controls as may be deemed desirable.

The automatic retraction and extension of the station wheels or other station supports may, as previously described, be accomplished in any preferred manner, one suitable arrangement being illustrated schematically in FIGURE 4. In the system illustrated, the control valve 164 may conveniently be provided with a simple dual electronic ring counter arrangement as illustrated in the functional block diagram shown as FIGURE 10. One counter would be set at the station number at which exit is desired, and sensors would be provided on the through track just downstream from the point at which the station tracks would deliver the vehicles to the through track. Each time a vehicle passes the sensor, the station passed counter is advanced one step. Assuming that the station at the beginning of the line is designated as Station 0 with successive stations being designated 1–2–3– etc., then with the preselection counter set to station $n$ the stations passed counter will register $n$ when the vehicle passes the station preceding $n$. The number 1 is registered when the vehicle passes the first check point just after entering the through track from station 0. Thus, the counter is always at one greater than the number of the stations passed and when the vehicle passes station $n-1$, the two counters register the same number. With this condition existent, a coincidence circuit then actuates the station wheel extension mechanism. It may be noted that the numbers registered on the counters would be cumulative, that is, the next pre-selected destination could be $n+m$. The station passed counter would then initiate the station wheel extension at $n+m-1$. In this way the counters would be reset (to 0) only at each end of the line. Thus, from a counter system viewpoint number 0 stations would be located at each end with stations numbered sequentially along the line. The station coding for passenger preselection, could, of course, be arbitrary. Each button with an applicable street or station name would correspond to and operate the system according to the $o-n$ control system code.

Emergency vehicle control operating on a sonar (or radar) principle may be used to prevent collision in the event that any vehicle should become stalled on the track or in the event the vehicle were travelling at a velocity below (or above) the cruising speed. In such situations, the sonar type control would provide the necessary emergency control over power and brake. This control would be exercised in the event of two different types of malfunction. For example, if a given vehicle travelling on the system were to reduce the distance between it and a next adjacent vehicle (indicating that the approaching vehicle were travelling faster than the other vehicle), power would be reduced or shut off and brakes applied. The degree of braking automatically applied would depend upon the rate of closure or approach. Also, in the event that the distance between the two cars would become less than a predetermined established minimum distance, the power would be reduced and brakes would be applied, as required.

Emergency control based upon the rate of closure may be accomplished by a simple technique which involves the automatic checking of distance at predetermined time intervals in the range of from about 10 to about 100 times per second. In such a system, the distance at each sampling or test time is compared with the distance at the preceding time. If the distance is found to be decreasing, a deceleration command is given to the overtaking vehicle. This arrangement or system requires a relatively simple memory or delay circuit which stores a distance measurement during one sampling period and performs a difference calculation. After each such calculation of the difference, the latest distance measurement would replace the previous one in the memory unit for comparison purposes so that the new distance may be compared with the next distance measurement, etc. A similar mode of control utilizing a continuous present spacing measurement and a delay line to provide a previous spacing (at a suitable time increment) is illustrated schematically in FIGURE 13.

The transportation system of the present invention is adapted to provide efficient service to stations along a cross-track, either of two basic concepts being applicable:

(1) A station located at the intersection of the tracks, or (2) A lift-off type transfer from one track to an intersecting or branch track.

The first method would utilize a separate set of cars on the different track systems and would therefore require passenger transfer from one vehicle to another. However, the transfer time would be very short because the on-demand mode of operation eliminates waiting for accommodations. This type of operation would, of course, require a complete stop, whereas the lift-off type of transfer between intersecting tracks would provide non-stop transit to and from stations along the intersecting tracks.

A schematic drawing of a typical track arrangement permitting through or cross and branch traffic to and from all directions is illustrated in FIGURE 2. As depicted, each line of the figure represents a pair of rails. The curved or "turn track" sections would be in a station track configuration so that switching would be effected through lift-off with subsequent descent to the cross through track. The distance between lift-off for a right or a left turn would be adequate to permit the station wheels to be extended and automatically checked after passing the first lift-off turn track and before reaching the second lift-off turn-track. (Adequate distance must also be allowed for retraction after descent and before the next turn-track descent region.) A control region check similar to that previously discussed is required to monitor and control descent from the turn-track and entrance upon the cross-through track. The rail car transit system of the present invention would provide efficient service of various types. For example, three class service might be as follows:

(1) An economy class, in which the first passenger would select his destination but boarding would be delayed until either a full load had arrived or a maximum waiting period, for example, five minutes, had elapsed.

(2) A first class, in which a vehicle would leave as soon as any passengers in the boarding area had entered the rail car and made a station selection.

(3) A private car class, in which a rail car would be occupied by a group travelling together, with no outsiders allowed.

In the class arrangements described above, the first class and the private cars would provide transportation on an on-demand or no-wait basis. The economy class would require the maximum waiting time (predetermined) only if a complete load contingent did not arrive within that predetermined time interval. To obtain maximum utilization of vehicles and minimum congestion during the rush hours, it might be desirable to provide only the economy class of service during these peak traffic periods. However, under such conditions the economy class would in fact provide essentially no-wait on-demand service.

Irrespective of the particular mode of operation decided upon, the entire system would be substantially independent of fixed time schedules. The on-demand type of operation would provide a transit system utilizing a specific cruising speed to achieve travel in a minimum total time as measured from arrival at the boarding station to passenger exit at the destination station. This minimum time would be achieved both during the day and during nighttime travel, and in all cases the rail cars would operate only when so required by the presence of a passenger, or when necessary to provide a proper supply of reserve cars at any particular station. Thus, the proposed transportation system which is characterized by the use of a unique switching arrangement, small cars, and random schedule operation, provides a combination of features assuring safety and convenience as well as greatly improved efficiency and flexibility.

While in the foregoing discussion the transportation system of the invention has been described with reference to the operation of single rail cars; the lift-off principle of the invention is equally applicable to train type operation, that is, to multiple connected vehicle systems. In this application the front portion of the train travels non-stop at constant speed from one end of the route to the other while the rear cars of the train and a pusher engine may be lifted off at any predetermined intermediate stations, thus delivering passengers to stations along an extended route.

In accordance with the practice of the invention it is possible not only to separate and lift off a portion of a train, but also to effect an intercoupling or rendezvous. For example, the pusher engine and cars with passengers from an intermediate station would leave shortly before arrival of the through train and would then accelerate as the through train passed through so as to to enter upon the through train passed through so as to enter upon through train and the cars and pusher engine from the intermediate station would then connect in a "track rendezvous" procedure. Thus, a new train would be formed with passengers from the beginning of the route and from the intermediate station. In general, the passengers would be travelling to and from each of the various stations along the route. Passenger rearrangement fore and aft, while travelling between stations, and a repetition of the lift off and rendezvous procedure would accommodate all passengers and provide each with non-stop transportation at essentially constant speed for the entire trip from boarding to departure.

The sequence of typical events in this type of lift off train operation is illustrated schematically in FIGURE 14 in which the significant times and distances are noted. Operation would be similar at all intermediate stations along the route. While the above descripition and sketch pertain to a pusher type engine concept, self-powered cars could be used without altering the operational sequence.

The most critical aspects of the train type control system are associated with the station train departure and the subsequent track rendezvous. It is apparent that the departure control mechanism may be similar to those utilized in the departure of the rail cars, previously discussed. However, in the train adaptation, is critical that the departing vehicles enter the through track a short distance aft of the through train so as to make subsequent rendezvous feasible. As a control means, a sensor is located along the through track to determine the precise moment when the station train should start its acceleration. That time is determined by starting the train from the station at the time and position relationship indicated in the diagram FIGURE 14C.

The track rendezvous involves a simple velocity and acceleration control of the type illustrated schematically in FIGURE 12. When overtaking the through train, the station train would be travelling somewhat faster than the through train and as the distance between the two decreases, the velocity of the rearward or following vehicle is gradually reduced. The distance separating the two trains is sensed and the deceleration control is activated by means of an ultrasonic emitter and receiver which operates in a manner similar to sonar or radar equipment. The control operates so that the relative velocity of the vehicles is small for the final contact, this contact being cushioned by a hydraulic shock absorber or by pneumatic or friction type energy absorbing units of the type well known in the relevant art. The system described ensures that the coupling operation is smooth and shock free.

A fail-safe interlock arrangement (FIGURE 15) is provided so that the doors between two vehicles will not open unless the vehicles are firmly coupled and the station wheels are retracted. Also the station wheel extension mechanism cannot be activated until the doors are firmly locked in the closed position, as indicated schematically in FIGURES 16 and 17.

Other fail-safe and safety controls and interlocks are provided so that the system will function with a very high degree of reliability and safety. While in the preferred form of the invention described the system utilizing the lift off switching concept is a highly automated type of operation, most of the functions may be performed under manual or semi-automatic control.

Upon consideration, it will be evident that the intermediate station loading and unloading areas need not be located along or even near the through track. While the lift-off portion of the station track and the descent or entrance portion must straddle the through track, between these two sections the station tracks may curve away from the through track and then extend for any arbitrary distance (blocks or many miles) to the destination and boarding station. In such a case the station track, after the lift-off, would curve away from the through track and follow a suitable route to the station. Both the off-course track and the entrance track from the station to the through track may of course be at grade level except for those portions which are immediately above the through tracks. This diverging track concept may be used for branch tracks that would serve more than one station and for other branches as well. The use of branch tracks makes feasible the same high speed non-stop service to stations over a complex network rather than merely to stations along a single route.

Stations along network branches may be served either by means of multi-level interchanges, as discussed above and illustrated schematically in FIGURE 2 or by feeder lines which require passenger transfer from the feeder vehicles to the vehicle at the station to be connected to the through train.

The lift-off train type system of the invention provides transportation service to and from any selected locations or cities served by the system and in a minimum of time for a specified route at a a given cruising speed, each trip being carried out at constant speed and without stops. Since the number of cars to be lifted from the through train and the number of cars to be subsequently added would depend upon passenger volume, the system is readily adaptable to the actual traffic conditions.

As with the single rail car system, the single degree of freedom characteristic of vehicles operating on rails or track produces a high degree of safety and calls for relatively simple system controls. Also as described above, the single degree of freedom permits a simple track rendezvous arrangement that is fully automated and provides reliable, safe and smooth operation.

It is evident that, unlike the rail car system which would operate on a random on-demand schedule, the lift off train system would operate on a fixed time schedule. Nevertheless, because of the non-stop constant speed operation and the rail type system which is essentially independent of weather conditions, the time schedule may be precisely maintained.

What is claimed is:

1. A transportation system for carrying personnel and material between stations spaced along a route traversed by a vehicle traveling along said route, said system comprising:

a vehicle adapted to ride on vehicle support means, first and second vehicle support means selectable for guiding of said vehicle for movement therealong, first and second vehicle-carried support engagement means for selectively engaging said support means for supporting said vehicle thereon, switching means operable to effect transfer of said vehicle between said first and second vehicle support means during travel of said vehicle along said route, and means for moving said vehicle when riding on said first support means, continuously along said route at selectable fixed system velocities.

2. The system set forth in claim 1 and further comprising means automatically operable to actuate said switching means prior to arrival of said vehicle at a preselected station on said route.

3. The system as set forth in claim 2 and further comprising means automatically operable to actuate said switching means upon departure of said vehicle from a preselected station on said route.

4. The system as set forth in claim 1 and further comprising a plurality of disconnected vehicles riding on said vehicle support means, and by reason of said fixed system velocity, being adapted to travel safely at closely spaced intervals without danger of collision.

5. The system as set forth in claim 1 wherein a plurality of spaced and disconnected vehicles travel simultaneously in a given direction along said first track means, and further comprising control means establishing substantially constant and identical velocities for said vehicles moving along said first vehicle support means between stations to preclude collisions between said vehicles.

6. The system as set forth in claim 5 and further comprising gating means operable to control entrance of a vehicle upon said first vehicle support means during travel of other vehicles thereon to obviate physical interference between said vehicle and said other vehicles traversing said first vehicle support means.

7. The system as set forth in claim 5 wherein said gating means includes a control region and sensing means, said sensing means being operable to detect presence of any vehicle in said region and to delay entrance of a vehicle into said control region until said region is clear of other vehicles.

8. The system as set forth in claim 5 and further comprising acceleration control means effective to ensure that any said vehicle entering upon said first vehicle support means shall have attained, at the time of its entrance upon said first support means, a cruising velocity corresponding to a velocity of said other vehicles traveling on said first vehicle support means.

9. The system as set forth in claim 1 wherein said vehicle comprises a plurality of cars interconnected in a linear array, and further comprising means to uncouple one of said cars from an adjacent said car during travel of said vehicle along said route while said vehicle is maintained in continuous motion.

References Cited

UNITED STATES PATENTS

| | | | |
|---|---|---|---|
| 2,592,704 | 4/1952 | Jerome | 246—122 |
| 2,657,642 | 11/1953 | Babcock | 104—28 |
| 3,012,517 | 12/1961 | Gale | 104—28 |
| 3,037,462 | 6/1962 | Barry | 104—18 |
| 3,150,609 | 9/1964 | Bradt | 104—172 |
| 3,268,727 | 8/1966 | Shepard | 246—187 |
| 3,353,019 | 11/1967 | Allen | 246—187 |
| 3,368,496 | 2/1968 | Falk | 104—18 |

JAMES B. MARBERT, Primary Examiner